(12) United States Patent
Brickell et al.

(10) Patent No.: US 8,356,181 B2
(45) Date of Patent: Jan. 15, 2013

(54) APPARATUS AND METHOD FOR A DIRECT ANONYMOUS ATTESTATION SCHEME FROM SHORT-GROUP SIGNATURES

(75) Inventors: Ernie F. Brickell, Portland, OR (US); Jiangtao Li, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 608 days.

(21) Appl. No.: 12/208,989

(22) Filed: Sep. 11, 2008

(65) Prior Publication Data

US 2009/0129600 A1    May 21, 2009

Related U.S. Application Data

(60) Provisional application No. 60/988,392, filed on Nov. 15, 2007.

(51) Int. Cl.
 *H04L 9/32* (2006.01)
(52) U.S. Cl. ...................................................... 713/180
(58) Field of Classification Search .................. 713/176, 713/180, 193; 705/67; 380/30
See application file for complete search history.

(56) References Cited

U.S. PATENT DOCUMENTS

| | | | | |
|---|---|---|---|---|
| 5,272,755 A | * | 12/1993 | Miyaji et al. | 380/30 |
| 7,555,652 B2 | * | 6/2009 | Camenisch | 713/180 |
| 7,581,107 B2 | * | 8/2009 | Camenisch | 713/176 |
| 2006/0010079 A1 | * | 1/2006 | Brickell | 705/67 |
| 2009/0019291 A1 | * | 1/2009 | Murray | 713/193 |

* cited by examiner

*Primary Examiner* — William Powers
*Assistant Examiner* — Abiy Getachew
(74) *Attorney, Agent, or Firm* — Blakely, Sokoloff, Taylor & Zafman LLP

(57) ABSTRACT

An apparatus and method is provided for a direct anonymous attestation scheme from short-group signatures. The method may include the creation of a group public/private key pair for a trusted membership group defined by an issuer; and assigning a cryptographic pair that is combined with a unique private member value to form a private membership key. A trusted member device generates the unique private member value during a join procedure of a trusted membership group. In one embodiment, the private member value of the private membership key is unknown to the issuer. A member may sign a message with the private membership key to form a short-group digital signature that is verified using a public key of the trusted membership group to maintain anonymity of trusted member devices. A size of the private membership key may be reduced to enable storage within a trusted platform module. Other embodiments are described and claimed.

13 Claims, 14 Drawing Sheets

APPARATUS AND METHOD FOR A DIRECT ANONYMOUS ATTESTATION SCHEME FROM SHORT-GROUP SIGNATURES

FIELD OF THE INVENTION

This application claims priority of Provisional Application No. 60/988,392 filed on Nov. 15, 2007, which is incorporated herein by reference in its entirety.

One or more embodiments of the invention relate generally to the field of cryptography. More particularly, one or more of the embodiments of the invention relates to a method and apparatus for a direct anonymous attestation scheme from short-group signatures.

BACKGROUND OF THE INVENTION

For many modern communication systems, the reliability and security of exchanged information is a significant concern. To address this concern, the Trusted Computing Platform Alliance (TCPA) developed security solutions for platforms. In accordance with a TCPA specification entitled "Main Specification Version 1.1b," published on or around Feb. 22, 2002, each personal computer (PC) is implemented with a trusted hardware device referred to as a Trusted Platform Module (TPM).

During operation, an outside party (referred to as a "verifier") may require authentication of the TPM. This creates two opposing security concerns. First, the verifier needs to be sure that requested authentication information is really coming from a valid TPM. Second, an owner of a PC including the TPM wants to maintain as much privacy as possible. In particular, the owner of the PC wants to be able to provide authentication information to different verifiers without those verifiers being able to determine that the authentication information is coming from the same TPM.

The REAL ID Act of 2005 is Division B of an act of the United States Congress titled Emergency Supplemental Appropriations Act for Defense, the Global War on Terror, and Tsunami Relief, 2005, Pub. L. No. 109-13, 119 Stat. 231 (May 11, 2005). The Real ID Act of 2005 creates a standard for the issuing of state driver's licenses. The Real ID Act is a law imposing federal technological standards and verification procedures on state driver's licenses and identification cards, many of which are beyond the current capacity of the federal government, and mandating state compliance by May 2008. One attempt to implement the Real ID Act on state driver's licenses generally exposes privacy sensitive information of the holder of the card. Unfortunately, such security information is often sold, without the owners consent, and used to conduct fraudulent transactions in the owner's name but without the owner's consent. Such activity is generally known as identity theft, which is a widespread phenomenon that is destroying the credit of innocent victims on a daily basis.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
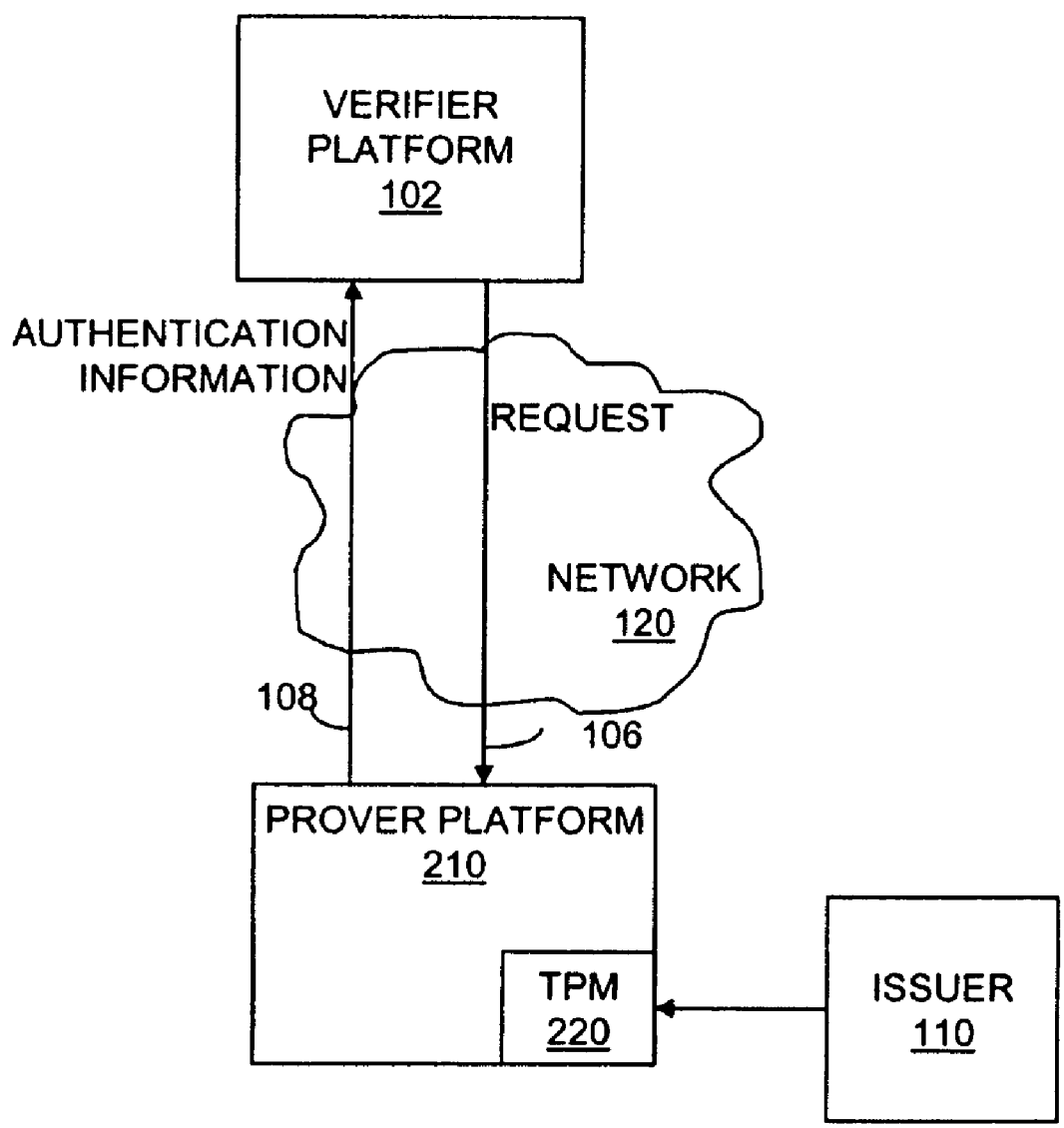
FIG. 1 is a block diagram illustrating a system featuring a platform implemented with a trusted platform module (TPM), in accordance with one embodiment.

A method and apparatus for a direct anonymous attestation (DAA) scheme from short-group signatures are described. In one embodiment, the DAA scheme uses computations over elliptic curves rather than using modular arithmetic, and pairing-based cryptography to reduce the key size and computation complexity. In one embodiment, the method includes the creation of a public/private key pair for a trusted membership group defined by an issuer; and assigning a cryptographic pair that is combined with a unique private member value to form a private membership key for proving membership within a trusted membership group. In one embodiment, the private member key is generated by an anonymous member device to join the trusted membership group defined by the issuer. In one embodiment, the private member value and the cryptographic pair form a private membership key for authentication of membership within a trusted membership group.

In one embodiment, an anonymous hardware device engages in a certification (join) procedure with the issuer to form a secret (private) member key to become a member of the trusted membership group. In one embodiment, the member device includes a trusted platform module (TPM) to digitally sign a message with the private membership key. For one embodiment, the functionality of the TPM to form the private membership key and digitally sign a message is deployed as firmware. However, it is contemplated that such functionality may be deployed as dedicated hardware or software. Instructions or code forming the firmware or software are stored on a machine-readable storage medium.

In one embodiment, using the private membership key, a member may sign a message received as an authentication request to form a short-group digital signature. In one embodiment, the short-group digital signature of the member can be verified using the public key of the trusted membership group. As a result, a verifier of the short-group digital signature is able to authenticate that the member is an actual (trusted) member of the trusted membership group. Authentication is performed without requiring the disclosure of any unique identification information of the member or the private membership key to enable a user of a trusted member device to remain anonymous to the verifier.

As described herein, a short-group digital signature may refer to a digital signature that is generated with a reduced size private membership key. For example, in one embodiment, a size of the private membership key may be reduced to enable storage within a trusted platform module of a host (prover) platform. In one embodiment, a size of the private membership key is reduced to enable storage within secure storage (e.g. the fuses) of a trusted platform module. For example, a size of the private membership key according to one embodiment may be at least one-third the size of a private membership key described in an ECC based DAA scheme of U.S. application Ser. No. 11/778,804 filed Jul. 17, 2007 by Ernest Brickell and Jiangtao Li, for "Direct Anonymous Attestation from Bilinear Maps."

In one embodiment, an ECC based DAA scheme which uses pairing cryptography provides an efficient method for remote authentication of a TPM while preserving the privacy of the user of the platform that contains the TPM. Compared to previous DAA schemes, the ECC and pairing based cryptographic DAA scheme described requires a much shorter private membership key size. In one embodiment, the key size may be reduced for storage within a TPM which has a limited storage space capacity. For example, a size of the private membership key may be reduced for use within the fuses of a device. In comparison to conventional DAA schemes which have private key sizes of 644 bytes, the ECC and cryptographic pairing based DAA scheme described may have key sizes within the range of 96 to 128 bytes, depending on a desired configuration. In one embodiment, the ECC and cryptographic pairing based DAA scheme may provide an implementation for anonymous authentication of graphics drivers.

Furthermore, in one embodiment for a reduced size private membership key (A,x,f,), A is 64 bytes, x is 32 bytes, and f is 32 bytes. For example, the cryptographic pair is 96 bytes and the private member value is 32 bytes. Although the TPM stores the private membership key in its "secure storage," the secure storage is not necessarily the fuses of the TPM. In one embodiment, a TPM may send (A, x) to the host so that the host can help compute the group signature. The TPM wants to keep a copy of (A, x, f) of its own. In one embodiment, the total size of the private membership key is 128 bytes (for a regular scheme) or 96 bytes (for alternative scheme as in FIG. 15). The ECC and pairing-based cryptographic DAA scheme described has cryptographic curves that are extensively used in the National Security Association (NSA) Suite-Space B algorithms.

Herein, "machine-readable storage medium" may include, but is not limited to a floppy diskette, hard disk, optical disk (e.g., CD-ROMs, DVDs, mini-DVDs, etc.), magneto-optical disk, semiconductor memory such as read-only memory (ROM), random access memory (RAM), any type of programmable read-only memory (e.g., programmable read-only memory "PROM", erasable programmable read-only memories "EPROM", electrically erasable programmable read-only memories "EEPROM", or flash), magnetic or optical cards, or the like. It is contemplated that a signal itself and/or a communication link can be regarded as machine-readable transmission medium since software may be temporarily stored as part of a downloaded signal or during propagation over the communication link.

In the following description, certain terminology is used to describe certain features of one or more embodiments of the invention. For instance, "platform" is defined as any type of communication device that is adapted to transmit and receive information. Examples of various platforms include, but are not limited or restricted to computers, personal digital assistants, cellular telephones, set-top boxes, facsimile machines, printers, modems, routers, smart cards, device drivers (e.g. a graphics chip), USB tokens, an identification card, driver's license, credit card or other like form factor device including an integrated circuit, or the like. A "communication link" is broadly defined as one or more information-carrying mediums adapted to a platform. Examples of various types of communication links include, but are not limited or restricted to electrical wire(s), optical fiber(s), cable(s), bus trace(s), or wireless signaling technology.

A "verifier" refers to any entity (e.g., person, platform, system, software, and/or device) that requests some verification of authenticity or authority from another entity. Normally, this is performed prior to disclosing or providing the requested information. A "prover" refers to any entity that has been requested to provide some proof of its authority, validity, and/or identity. A "prover" may be referred to as "signer" when the prover responds to an authentication request by signing a message using a private member key. An "issuer" defines a trusted membership group and engages with hardware devices to join the trusted membership group. A "device manufacturer," which may be used interchangeably with "certifying manufacturer," refers to any entity that manufactures or configures a platform or device (e.g., a Trusted Platform Module). An issuer may be a device/certifying manufacturer.

As used herein, to "prove" or "convince" a verifier that a prover has possession or knowledge of some cryptographic information (e.g., a private member key) means that, based on the information and proof disclosed to the verifier, there is a high probability that the prover has the cryptographic information. To prove this to a verifier without "revealing" or "disclosing" the cryptographic information to the verifier means that, based on the information disclosed to the verifier, it would be computationally infeasible for the verifier to determine the cryptographic information. Such proofs are hereinafter referred to as direct proofs.

Throughout the description and illustration of the various embodiments discussed hereinafter, coefficients, variables, and other symbols (e.g., "h") are referred to by the same label or name. Therefore, where a symbol appears in different parts of an equation as well as different equations or functional description, the same symbol is being referenced.

FIG. 1 illustrates system 100 featuring a platform implemented with a trusted hardware device (referred to as "Trusted Platform Module" or "TPM") in accordance with one embodiment. A first platform 102 (Verifier) transmits an authentication request 106 to a second platform 200 (Prover) via network 120. In response to request 106, second platform 200 provides the authentication information 108. In one embodiment, network 120 forms part of a local or wide area network, and/or a conventional network infrastructure, such as a company's Intranet, the Internet, or other like network.

Additionally, for heightened security, first platform 102 may need to verify that prover platform 200 is manufactured by either a selected device manufacturer or a selected group of device manufacturers (hereinafter referred to as "device manufacturer(s) (issuer) 110"). In one embodiment, first platform 102 challenges second platform 200 to show that it has cryptographic information (e.g., a private member key) generated by issuer 110. Second platform 200 replies to the challenge by providing authentication information, in the form of a reply, to convince first platform 102 that second platform 200 has cryptographic information generated by issuer 110, without revealing the cryptographic information or any device/platform user identification information, referred to herein as "unique identification information" to enable a user of a trusted member device to remain anonymous to the verifier.

Figure 2:
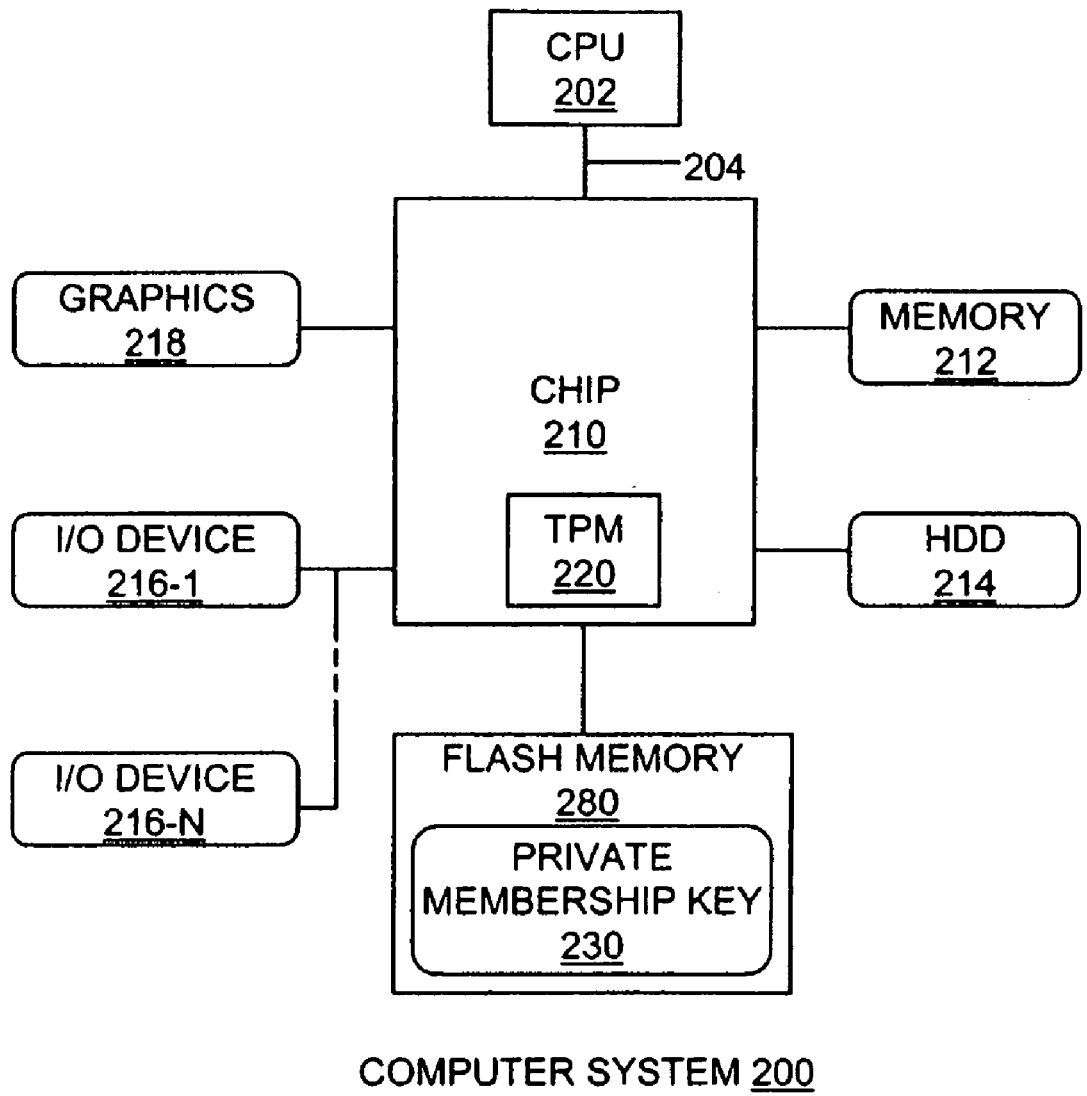
FIG. 2 is a block diagram further illustrating the platform of FIG. 1, in accordance with one embodiment.

FIG. 2 is a block diagram further illustrating an embodiment of anonymous platform 200 including TPM 220 that may have a group membership certificate that is common to all of the TPMs in the same trusted membership group as TPM 220. A private membership key provides a short-group digital signature that can be verified using a group public membership key of TPM 220. In one embodiment, TPM 220 in combination with platform 200 generates authentication information using private unique membership key 230 to prove to a verifier that platform 200 is a member of a trusted membership group defined by an issuer 110 (e.g., device manufacturer), without disclosure of any unique identification information including the private membership key to enable trusted platform 200 to remain anonymous to verifier 102 (FIG. 1). Representatively, computer system 200 comprises a processor system interconnect 204 for communicating information between processor (CPU) 202 and chipset 210. As described herein, the term "chipset" is used in a manner to collectively describe the various devices coupled to CPU 202 to perform desired system functionality.

Representatively, graphics block 218, as well as hard drive devices (HDD) 214 and main memory 212 are coupled to chip 210. In one embodiment, graphics block 218 comprises a graphics chip, or alternatively, chip 210 may incorporate graphics block 218 and operate as a graphics memory controller hub (GMCH). In one embodiment, chip 210 is configured to include a memory controller and/or an input/output (I/O) controller to communicate with I/O devices 216 (216-1, . . . , 216-N). In one embodiment, main memory 212 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

Figure 3:
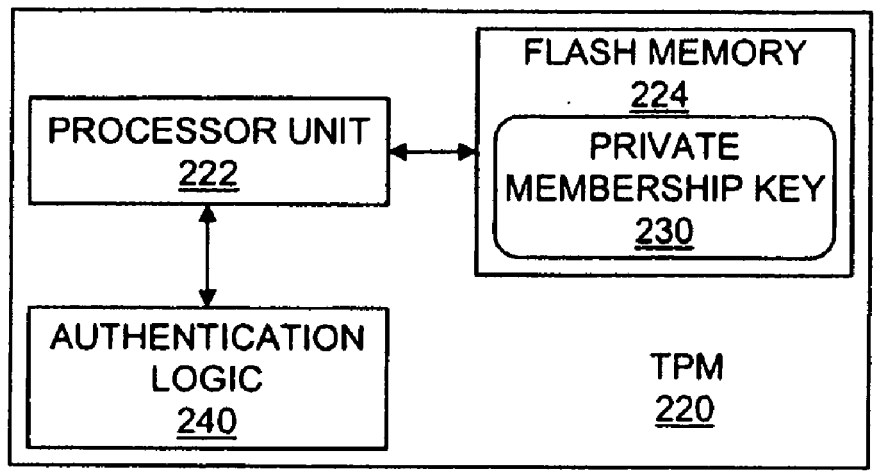
FIG. 3 is a block diagram further illustrating the TPM of FIGS. 1 and 2, in accordance with one embodiment.

FIG. 3 further illustrates Trusted Platform Module (TPM) 220 of second platform 200, in accordance with one embodiment. TPM 220 is a cryptographic device that is manufactured by a device manufacturer. In one embodiment, TPM 220 comprises processor unit 222 with a small amount of on-chip secure memory encapsulated within a package. In one embodiment, the encapsulated memory may be used to store a private membership key 230 that includes a private member value generated during a join procedure with an issuer 110. In one embodiment, the private membership keys of trusted member devices are unknown to the issuer 110. TPM 220 is configured to provide authentication information to first platform 102 that would enable it to determine that the authentication information is transmitted from a valid TPM. The authentication information used is randomized data that would make it highly likely that the TPM's or second platform's identity can be determined.

In one embodiment, TMP 220 further comprises non-volatile memory 224 (e.g., flash) to permit storage of cryptographic information such as one or more of the following: keys, hash values, signatures, certificates, etc. In one embodiment, the cryptographic information is a cryptographic pair received from an issuer 110 such as, for example, a certifying manufacturer. As shown below, a hash value of "X" may be represented as "Hash(X)". Of course, it is contemplated that such information may be stored within external memory 280 of platform 200 in lieu of flash memory 224. The cryptographic information may be encrypted, especially if stored outside TPM 220.

In one embodiment, TPM 220 includes authentication logic 240 to respond to an authentication request from a verifier platform. In one embodiment, authentication logic 240 computes a short-group digital signature according to a received message using private membership key 230 to convince or prove to the verifier platform that TPM 220 has stored cryptographic information concurrently generated with an issuer of a trusted membership group, without revealing any unique identification information. As a result, authentication logic 240 performs the requested authentication while preserving the identity of the prover platform to maintain anonymity of platform 200. Authentication logic 240 is further illustrated with reference to FIG. 4.

In one embodiment, certification logic 270 forms private member exponent of the private membership key 230 during a one-round certification procedure with an issuer of a cryptographic pair. In one embodiment, signature logic 260 may sign a message received as part of an authentication request from a verifier. Representatively, revoked key logic 250 convinces or proves to a verifier platform that a private member value of private membership key 230 held by platform 200 is not a revoked (compromised) private member value. In an alternate embodiment, verification that the private member value is not a revoked member value is performed by a verifier. It is appreciated that a lesser or more equipped computer than described above may be desirable for certain implementations.

In one embodiment, each hardware device, which is a member of a trusted membership group, forms a unique, private member value component during a certification (join) procedure with an issuer. Representatively, a trusted member device, having an assigned cryptographic pair and a generated private member key, forms a private membership key and is able to sign a message received as part of an authentication request from a verifier. However, in contrast to a traditional digital signature system, verification of a short-group digital signature created with a private membership key of a member device is verified using a group public key for the trusted membership group defined by the issuer.

According to the DAA scheme described herein, using its private membership key, a member device of a trusted membership group limits the disclosure of unique identification information to an indication that the device is a member of a trusted membership group of trusted hardware devices, which may be defined by a certifying manufacturer (issuer). In one embodiment, the DAA scheme described herein may include the following features: (1) the issuer in our scheme cannot learn a member's private member value, (2) the issuer cannot trace which member signs which signatures, (3) efficient revocation is supported, that is, if a member's private member value gets corrupted and published widely so that a verifier knows this compromised private member value, then the verifier can recognize and reject any signatures created by the private member value.

In one embodiment, authentication logic 240 enables one to prove that he is a member in a group without revealing any information about his identity. In one embodiment, a member of a group has a credential ("group membership certificate") that may be used instead of a cryptographic pair to prove membership in the group. In one embodiment, the private member value is unique for every different member of the group and each member selects a secret random value as a private member exponent (value) of the member that is unknown to the issuer. However, a group public key of the trusted membership group is the same for all members of the group.

As described herein, the issuer, such as issuer 110, is the entity that establishes that a person (or an entity) is a member of a group, and then issues a credential to the member that is used to form a private membership key of the member. As further described herein, the prover is a person or entity that is trying to prove membership in the group. If the prover is indeed a member in the group and has a valid credential, the proof should be successful. As further described herein, the verifier is the entity that is trying to establish whether the prover is a member of the group or not, so the prover is trying to prove membership to the verifier.

Figure 4:
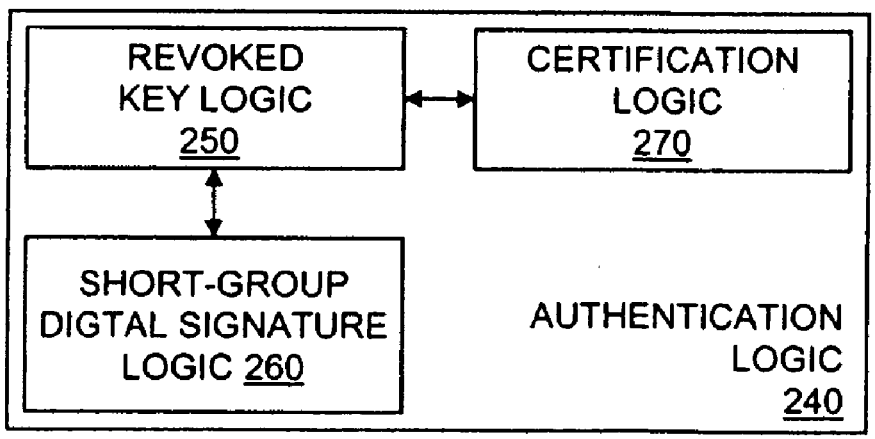
FIG. 4 is a block diagram further illustrating authentication logic of FIG. 3, in accordance with one embodiment.

As shown in FIG. 4, to prove membership, a verifier requests that the prover digitally sign some messages in, for example, digital signature logic 260. If the verifier needs to know that the message was signed at the current time, then the verifier would create a random value (a nonce) that is given to the prover to include in the signature. The prover signs the message using a private membership key and sends a short-group signature to the verifier. As described herein, such signature is referred to as a short-group digital signature since it is verified with the published, group public key of the trusted membership group and is generated with a reduced size private membership key.

In one embodiment, a verifier can verify the signature using the group public key and, if verification succeeds, the verifier knows that the prover is a member of a trusted group. If the nonce was used, the verifier knows that the group signature was created between the time he sent the nonce and the time the signature was received. Hence, the verifier does not learn which member created the group digital signature to maintain anonymity of trusted members of a group.

In one embodiment, TPM 220 may be incorporated on a smart card, including a form factor of a PCMCIA card for insertion into a PCMCIA slot, or incorporated on an identification device such as a driver's license, identification card, credit card or other like configuration having the form fact of the standard driver's license/credit card and including an integrated circuit to perform one or more cryptographic procedures as described herein. However, it should be recognized that certain cryptographic functions may be computed by an attached host, such as platform 200. According to such a configuration, use of TPM 220 on, for example, a driver's license would enable conformance with the Real ID Act of 2005, as referred to above, without the disclosure of privacy sensitive information.

According to such a configuration, the Department of Motor Vehicles, or DMV, is the issuer and engages in a setup procedure to create a group public key and a group issuing private key. The issuer publishes the public key and keeps the group issuing private key private. According to such a procedure, for each issued driver's license, a general procedure is followed to provide a user private member key from the issuer including a private member key component that is unknown to the issuer. Accordingly, the user private member key together with the group public key is the user's credential for this group.

In accordance with such an embodiment, when TPM 220, as well as authentication logic, as shown in FIG. 4, is incorporated onto a card having a form factor of a standard driver's license, credit card or other like smart card device for accessing bank machines or the like, a holder of the card can engage in a verification procedure to prove that the owner of the card is not a revoked member without requiring, for example, the issuer (DMV) to have a copy of the compromised private keys.

Figure 5:
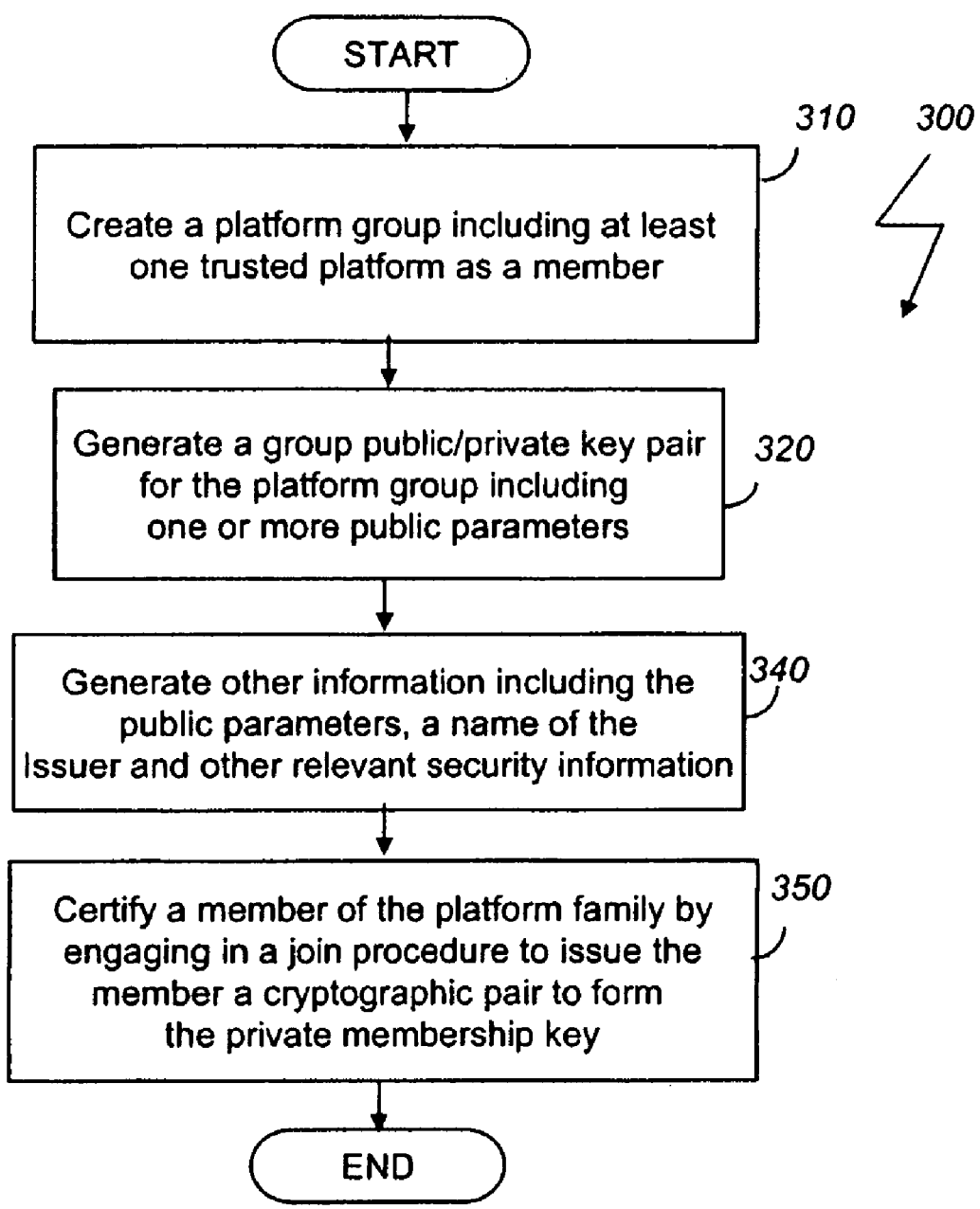
FIG. 5 is a flowchart illustrating a method for establishing a trusted membership group of trusted member devices, in accordance with one embodiment.

FIG. 5 is a flowchart illustrating a method 400 to form a trusted membership group public key in accordance with one embodiment. A "trusted membership group" may be defined by the issuer to include one or more types of platforms or devices. For instance, a trusted membership group may be the set of all platforms (members) that have a common element of security relevant information, such as a group public key. This security relevant information could include the manufacturer and model number of the particular platform or device. For each trusted membership group, an issuer creates cryptographic parameters that are used for that trusted membership group. The issuer and member device collectively create a private membership key during a join procedure that is used to sign messages, received by member devices (e.g., platform 200 or TPM 220), to convince a verifier that the device is a member of a trusted membership group.

In one embodiment, an issuer creates a trusted membership group including at least one trusted hardware device as a member device (block 310). In one embodiment, the issuer utilizes a public key cryptographic function (e.g., elliptical curve cryptography) to create a group public/private key pair. This can be created using well known methods, such as those described in *Applied Cryptography*, by Bruce Schneier, John Wiley & Sons; ISBN: 0471117099; Second Edition (1996).

The issuer may generate a group membership certificate that comprises public parameters, the security relevant information of the trusted membership group. Once the Platform group public/private key is generated, a certification procedure of each member device of the trusted group is performed (block 350). As part of the certification process, the issuer provides the group membership certificate to the members or devices of the trusted group. The distribution of cryptographic parameters associated with the group membership certificate from a prover (e.g., second platform 200 in FIG. 1) to a verifier may be accomplished in a number of ways. However, these cryptographic parameters should be distributed to the verifier in such a way that the verifier is convinced that the group membership certificate was generated by the issuer.

For instance, one accepted method is by distributing the parameters directly to the verifier. Another accepted method is by distributing the group membership certificate signed by a certifying authority, being the issuer as one example. In this latter method, the public key of the certifying authority should be distributed to the verifier, and the signed group membership certificate can be given to each member in the trusted group (prover platform). The prover platform can then provide the signed Group Membership Certificate to the verifier.

Figure 6:
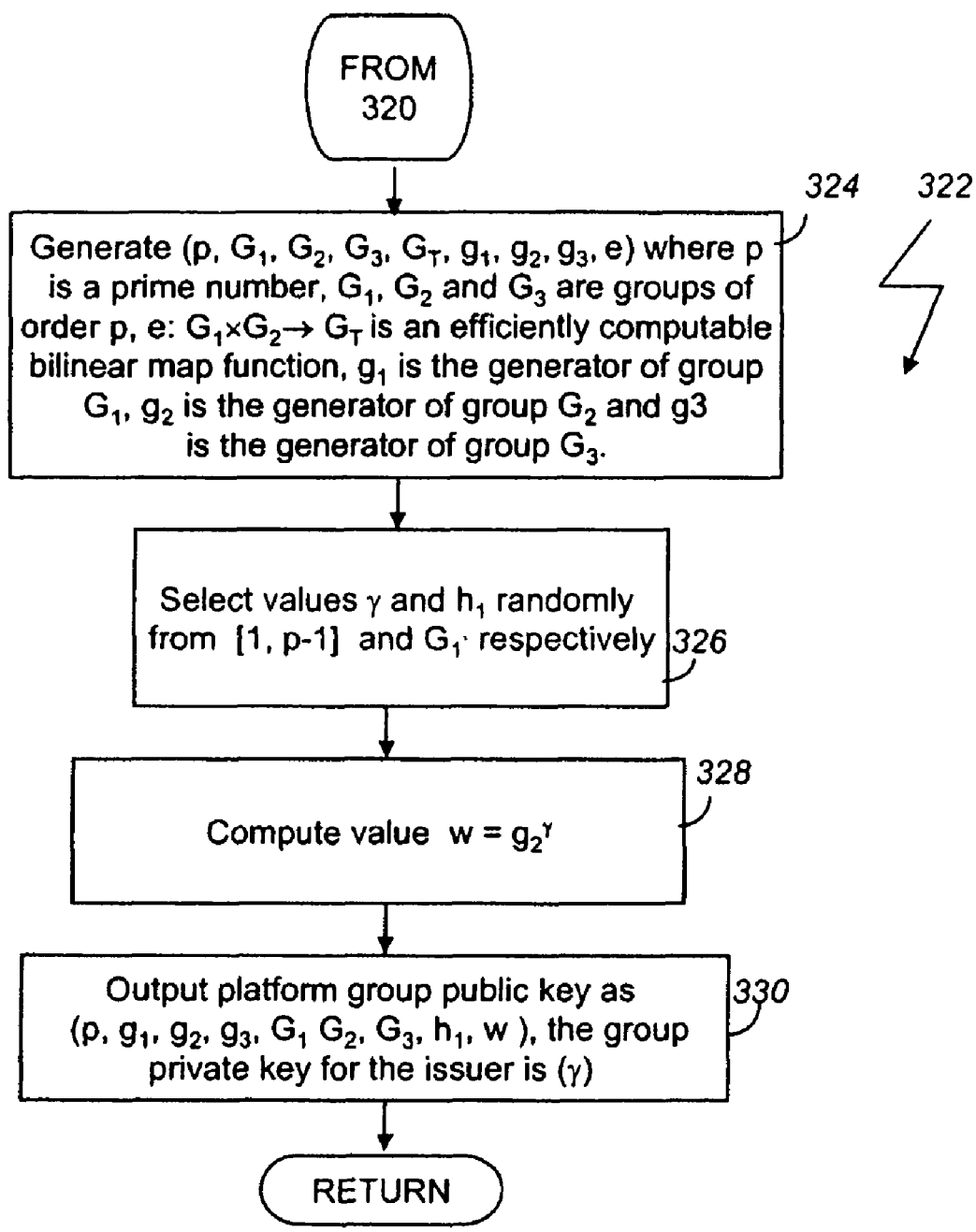
FIG. 6 is a flowchart illustrating a method for generating a group public/private key pair and one or more public parameters, in accordance with one embodiment.

FIG. 6 is a flowchart illustrating a method 322 for generating a group public/private key pair for the platform group including one or more public parameters of process block 320 of FIG. 5, according to one embodiment. Generation of the public/private key pair and platform parameters for a platform group enables member devices to identify themselves as trusted member devices without revealing any unique, device identification information. In one embodiment, generation of the group public parameters, as described with reference to FIG. 6, is referred to herein as a set-up protocol.

In one embodiment, the set-up protocol is used by the hardware manufacturer (issuer) to create the public/private key pair and other cryptographic parameters needed by the manufacturer to certify member devices in order to generate a unique private member key for each member device of the trusted group defined by an issuer.

Referring again to FIG. 6, at process block 324, the issuer generates (p, $G_1$, $G_2$, $G_3$, $G_T$, $g_1$, $g_2$, $g_3$, e), where p is a prime number. In one embodiment, the issuer chooses bilinear groups $G_1$ and $G_2$ of prime order p with generators g1 and g2, respectively. The issuer also chooses a group $G_3$ of prime order p with generator $g_3$ where decisional Diffie-Hellman problem in $G_3$ is hard. Note that we could set $G_3$ to be the same group as $G_1$ or $G_T$. In one embodiment, a group digital signature is generated using a private member key to enable attestation based on bilinear maps. For example, let e: $G_1 \times G_2 \rightarrow G_T$ be an efficiently computable bilinear map function with the following properties:

(1) For all u in $G_1$ and v in $G_2$, for all integers a and b, $e(u^a, v^b) = e(u, v)^{ab}$, (2) e(g1, g2) is not the identity of $G_T$, and (3) there exists an efficient algorithm for computing e(u, v) for any u in $G_1$ and v in $G_2$.

Referring again to FIG. 6, at process block 326, the issuer randomly selects $h_1$ in $G_T$. Next the issuer selects a random γ from [1, p−1]. Once $h_1$ and γ are selected, at process block 328, the issuer computes $w=g_2^\gamma$. At process block 330, the group public key is (P, $g_1$, $g_2$, $g_3$, $G_1$, $G_2$, $G_3$, $h_1$, w), the private key for the issuer γ. In one embodiment, H (•) is a collision resistant hash function that maps any length messages to elements in [0, p−1].

Once the platform group public/private key are formed, the issuer may certify each member of the platform group according to a join procedure, as further illustrated with reference to FIG. 7. Representatively, FIG. 7 is a flowchart illustrating a method 351 for certifying member devices of a trusted platform group of process block 350 of FIG. 5, in according to one embodiment.

Representatively, a platform interacts with the issuer to join the group, which may be referred to herein as a "join protocol." At process block 352, the TPM derives a private member exponent (value) f from its DAA seed that is not revealed to the issuer and sets $F=h_1^f$. At process block 354, the issuer checks for all f in the revocation list to determine whether $F \neq h_1^f$. At process block 356, it is determined whether the revocation check of block 354 is successful. If the issuer finds that the platform has been revoked (i.e., there exists an f in the revocation list such that $F=h_1^f$), it aborts the protocol at process block 357.

Figure 7:
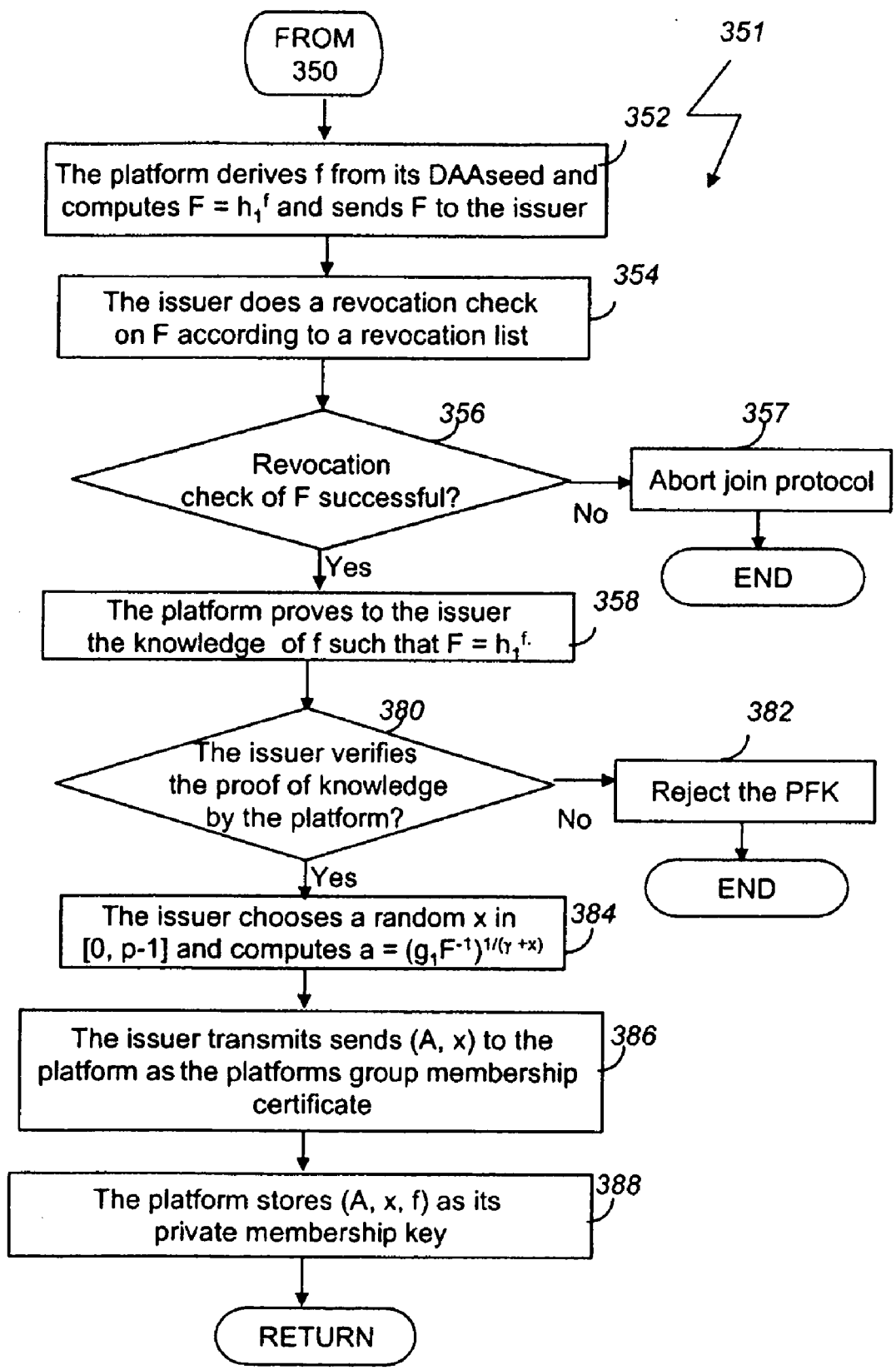
FIG. 7 is a flowchart illustrating a method for a join protocol to certify a member device of the trusted membership group, in accordance with one embodiment.

As further shown in FIG. 7, at process block 358, the platform proves to the issuer the knowledge of f, such that $F=h_1^f$. At process block 380, the issuer verifies the proof of knowledge performed by the platform. At process block 382, the issuer chooses a random x in [0, p−1] and computes $A=(g_1 F^{-1})^{1/(\gamma+x)}$. At process block 382, the issuer sends (A, x) back to the platform as the platform's membership certificate (cryptographic pair). At process block 384, the platform store (A, x, f) as its private membership key. In one embodiment, the private membership key of a member device includes the private membership key f as well as the cryptographic pair (A, x) as (A, x, f).

Figure 8:
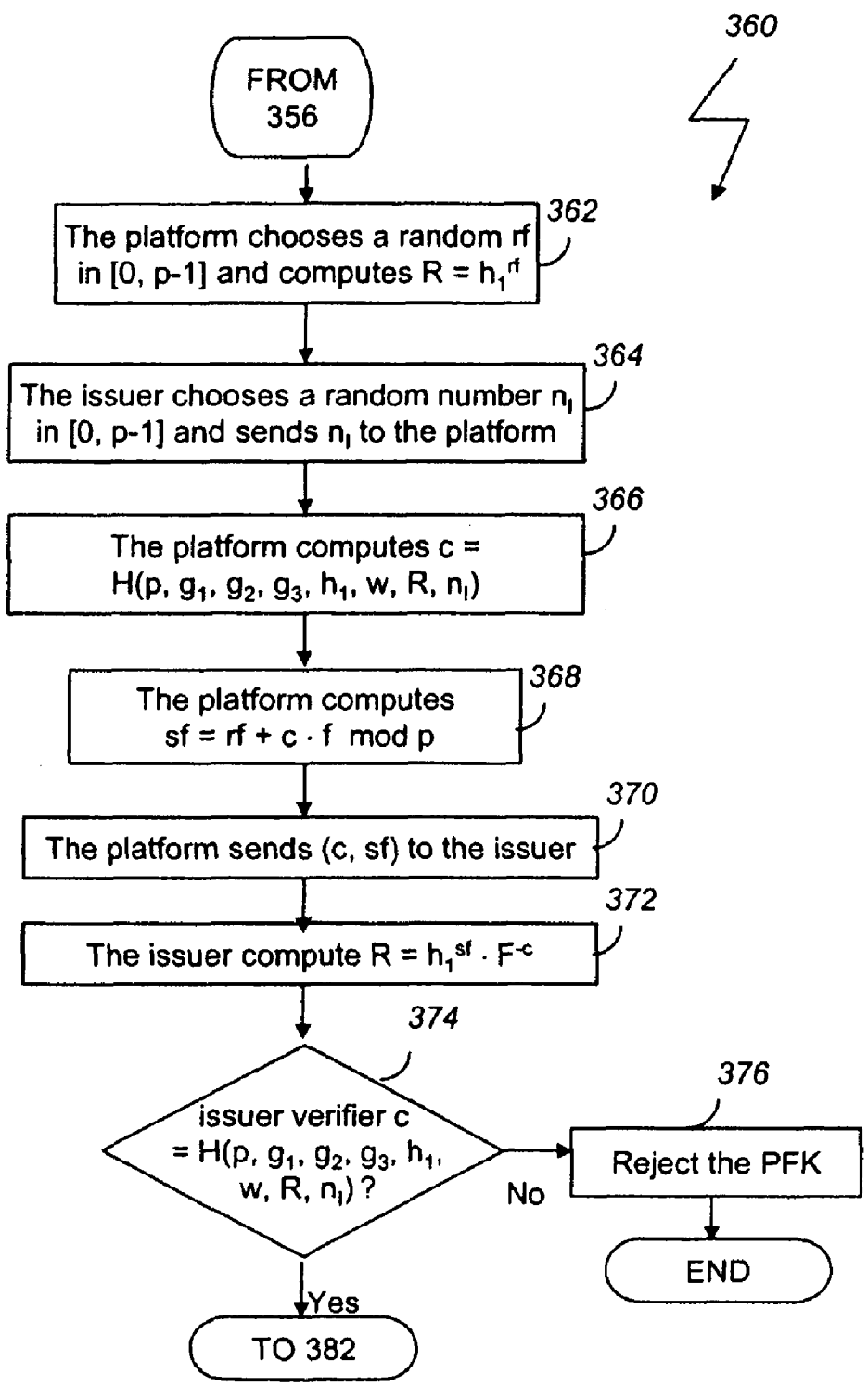
FIG. 8 is a flowchart illustrating a method for verification of a proof of knowledge regarding a private membership key generated by a platform during a join procedure of a trusted platform group according to one embodiment.

In one embodiment, the platform also performs a proof of knowledge (PK) to the issuer as shown in FIG. 8 (this corresponds to process block 358 and 380):

$$PK\{(f): F=h_1^f\}.$$

FIG. 8 is a flowchart illustrating a method 360 for verifying a proof of knowledge regarding a private member key selected by a platform during a join procedure of a trusted platform group according to one embodiment. Representatively, at process block 362, the platform chooses a random rf in [0, p−1] and computes $R=h_1^{rf}$. At process block 364, the issuer chooses a random number $n_1$ in [0, p−1] and sends $n_1$ to the platform. At process block 366, the platform computes $c=H(p, g_1, g_2, g_3, h_1, w, R, n_1)$. At process block 368, the platform computes sf=rf+c·f mod p. At process block 370, the platform sends (c, sf) to the issuer. At process block 372, the issuer computes $R=h_1^{sf} \cdot F^{-c}$. At process block 374, the issuer verifier that $c=H(p, g_1, g_2, g_3, h_1, w, R, n_1)$. Otherwise, the proof of knowledge is rejected at process block 376.

Figure 9:
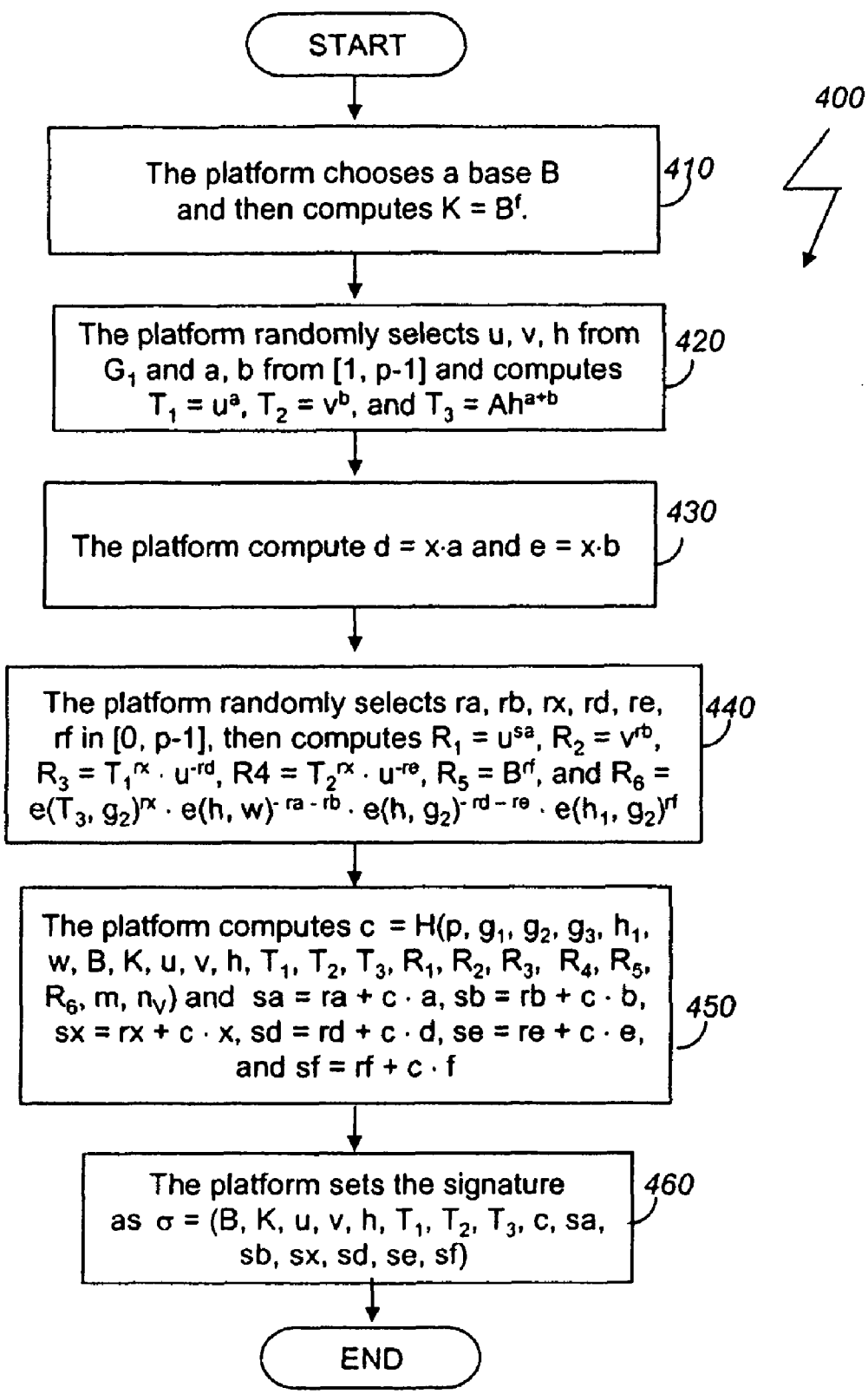
FIG. 9 is a flowchart illustrating a method for generating a short-group digital signature in response to a received verification request, in accordance with one embodiment.

FIG. 9 is flowchart illustrating a method 400 for computing a private member key by a member device of a trusted platform group, in accordance with one embodiment. At process block 410, the platform chooses a base B. To sign a message m, the platform has (A, x, f) as a private membership key. In a random base option, the platform chooses B randomly from group $G_3$. In a named-base option, the platform derives B from the verifier's base-name as $B=H_3$(base-name), where $H_3$ is a collision-resistant hash function mapping any length message to a group element in $G_3$. The platform then computes a pseudonym $K=B^f$. At process block 420, the platform selects randomly u, v, h from $G_1$ and a, b from [0, p−1]. The platform then computes $T_1=u^a$, $T_2=v^b$, and $T_3=Ah^{a+b}$.

As further shown in FIG. 9, at process block 430, the user then computes d=x·a and e=x·b. At process block 440, the platform randomly picks six integers ra, rb, rx, rd, re, rf from [0, p−1]. In addition, the platform computes $R_1=u^{ra}$, $R_2=v^{rb}$, $R_3=T_1^{rx} \cdot u^{rd}$, $R_4=T_2^{rx} \cdot u^{re}$, and $R_5=B^{rf}$. The platform also computes $R_6=e(T_3, g_2)^{rx} \cdot e(h, w)^{-ra-rb} \cdot e(h, g_2)^{-rd-re} \cdot e(h_1, g_2)^{rf}$. At process block 450, the the platform computes $c=H(p, g_1, g_2, g_3, h_1, w, B, K, u, v, h, T_1, T_2, T_3, R_1, R_2, R_3, R_4, R_5, R_6, m, n_v)$ In addition, the platform computes sa=ra+c·a, sb=rb+c·x, sd=rd+c·d, se=re+c·e, and sf=rf+c·f. At process block 460, the signature created is then and the platform sets the signature σ=(B, K, u, v, h, $T_1$, $T_2$, $T_3$, c, sa, sb, sx, sd, se, sf).

In one embodiment, the TPM could choose B from any group $G_3$ where the decisional Diffie-Hellman problem in $G_3$ is hard. In one embodiment, the revocation check can be performed on $G_1$ instead of $G_3$.

Accordingly, using private membership key (A, x, f), a trusted platform is allowed to identify itself as a trusted hardware device by indicating that the device is a member of a group of trusted anonymous hardware devices defined by, for example, a certifying manufacturer, referred to herein as an issuer. In one embodiment, each hardware device, which is a member of a trusted platform group, generates a unique, private member value (f) of the private membership key (A, x, f) that is unknown to the issuer of the trusted platform group. Representatively, a trusted hardware device, having a private membership key, is able to sign a message received as part of an authentication request from a verifier to form a short-group digital signature if a size of at least the private member key component is reduced to enable TPM storage. However, in contrast to a traditional digital signature system, verification of a digital signature created with a unique, private membership key of a trusted member device is verified using a group public key for the platform group defined by the issuer.

Figure 10:
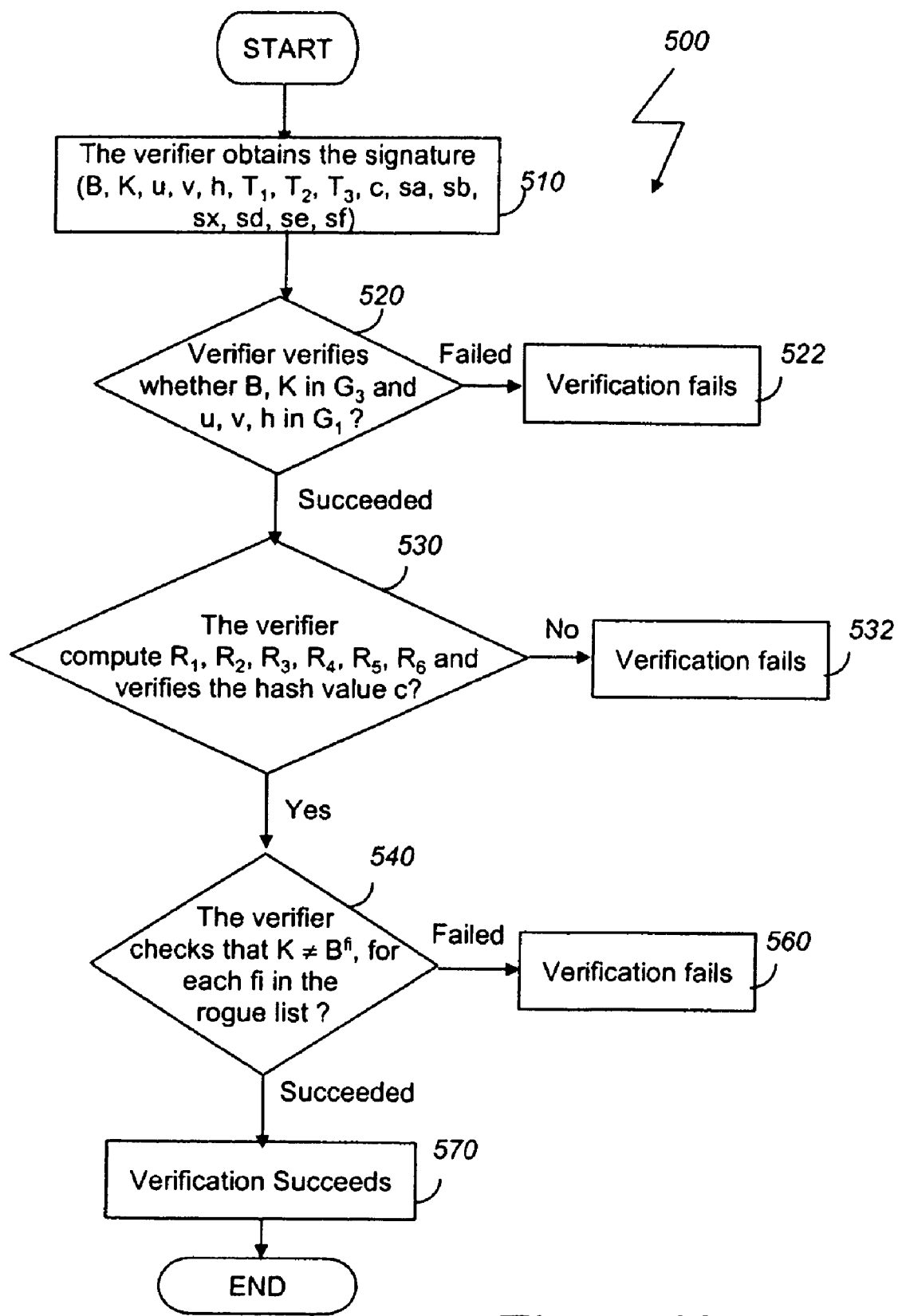
FIG. 10 is a flowchart illustrating a method for verifying a short-group digital signature of a device to authenticate the device as a trusted member device of a trusted membership group, in accordance with one embodiment.

FIG. 10 is a flowchart illustrating a method 500 for a verification algorithm to check signatures for validity with respect to the short-group public key, in accordance with one embodiment. In one embodiment, given a group public key $(p, g_1, g_2, g_3, G_1, G_2, G_3, h_1, w)$, a message m and a nonce $n_v$, and a short-group signature $\sigma = (B, K, u, v, h, T_1, T_2, T_3, c, sa, sb, sx, sd, se, sf)$, a verifier can verify the signature as shown in FIG. 10. The verifier obtains the short-group signature in response to an authentication request at process block 510. At process block 520, the verifier verifies that B, K in $G_3$ and u, v, h are in $G_1$. At process block 530, the verifier computes $R_1 = u^{sa} \cdot T_1^{-c}$, $R_2 = v^{sb} \cdot T_2^{-c}$, $R_3 = T_1^{sx} \cdot u^{-sd}$, $R_4 = T_2^{sx} \cdot v^{se}$, and $R_5 = B^{sf} \cdot K^{-c}$. In addition, the verifier computes $R_6 = e(T_3, g_2)^{sx} \cdot e(h, w)^{-sa-sb} \cdot e(h, g_2)^{-sd-se} \cdot e(h_1, g_2)^{sf} \cdot (e(T_3, w)/e(g_1, g_2))^c$. The verifier also verifies that $c = H(p, g_1, g_2, g_3, h_1, w, B, K, u, v, h, T_1, T_2, T_3, R_1, R_2, R_3, R_4, R_5, R_6, m, n_v)$ at process block 530.

As further illustrated in FIG. 10, if the hash value of c cannot be verified, verification fails at process block 532. At process block 540, the verifier checks whether the signature has been revoked, i.e., for each revoked member value fi in the rogue list, the verifier checks that $K \neq B^{fi}$. For each fi in rogue-list, the verifier checks that $K \neq B^{fi}$, as shown in FIG. 10. If a matching revoked member value is detected, verification fails at process block 560; otherwise, verification succeeds at process block 570, for example, as shown in FIG. 11.

Figure 11:
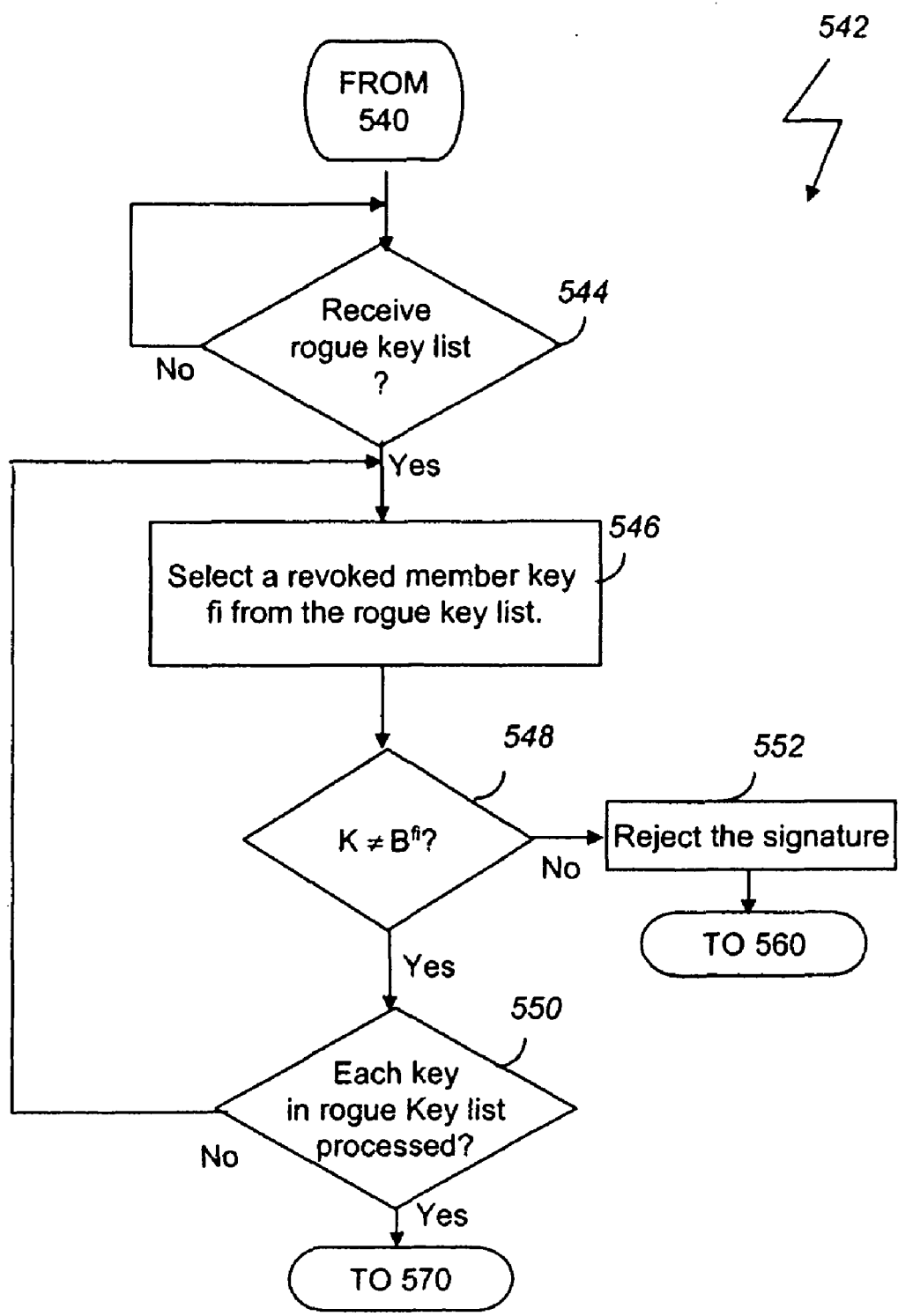
FIG. 11 is a flowchart illustrating a method to verify that a private membership key used to generate a received short-group signature includes a non-revoked private member value, in accordance with one embodiment.

FIG. 11 is a flowchart illustrating a method 542 for ensuring that a private membership key of a member device includes an unrevoked private member value, in accordance with one embodiment. Accordingly, at process block 544, it is determined whether a rogue key list is received. Once received, at process block 546, a revoked member value is selected from the rogue key list. At process block 548, it is determined whether a pseudonym value K received as part of the short-group digital signature is not equal to an equation of the form $K = B^{fi}$. If the pseudonym value K equals the equation, the signature is rejected at process block 552. Otherwise, at process block 550, process blocks 546-548 are repeated for each revoked member value in the revoked key list until each value in the revoked key list is processed. Accordingly, assuming that value K of the short-group signature does not match $B^{fi}$, the digital signature received from the member device is accepted.

In one embodiment, the member or trusted hardware device may generate a standard public/private key pair using a conventional cryptographic protocol, such as ECC. Accordingly, in one embodiment, the private member key of the member device may be used to sign a public ECC key to illustrate that the public key was generated by a trusted hardware device. Accordingly, subsequent transactions may be performed using the conventional public/private key ECC pair following initial authentication of the member device as a trusted hardware device of a platform group.

In one embodiment, a DAA scheme may be based on a Boneh Shacham (BS) group signature scheme, for example, as described in the document "Group Signatures with Verifier Local Revocation" by Dan Boneh and Hovav Shacham. In one embodiment, the setup for the DAA scheme is based on, for example, a setup protocol, as described with reference to FIG. 6, to provide a platform group public key as well as a private key for the issuer that establishes the trusted platform group. The join procedure for this DAA scheme can be performed, for example, as shown in FIG. 7, where a membership private key for the platform is collectively generated to establish a platform as a trusted member platform of the trusted platform group according to one embodiment. The sign procedure for this DAA scheme may be performed as shown in FIG. 12.

Figure 12:
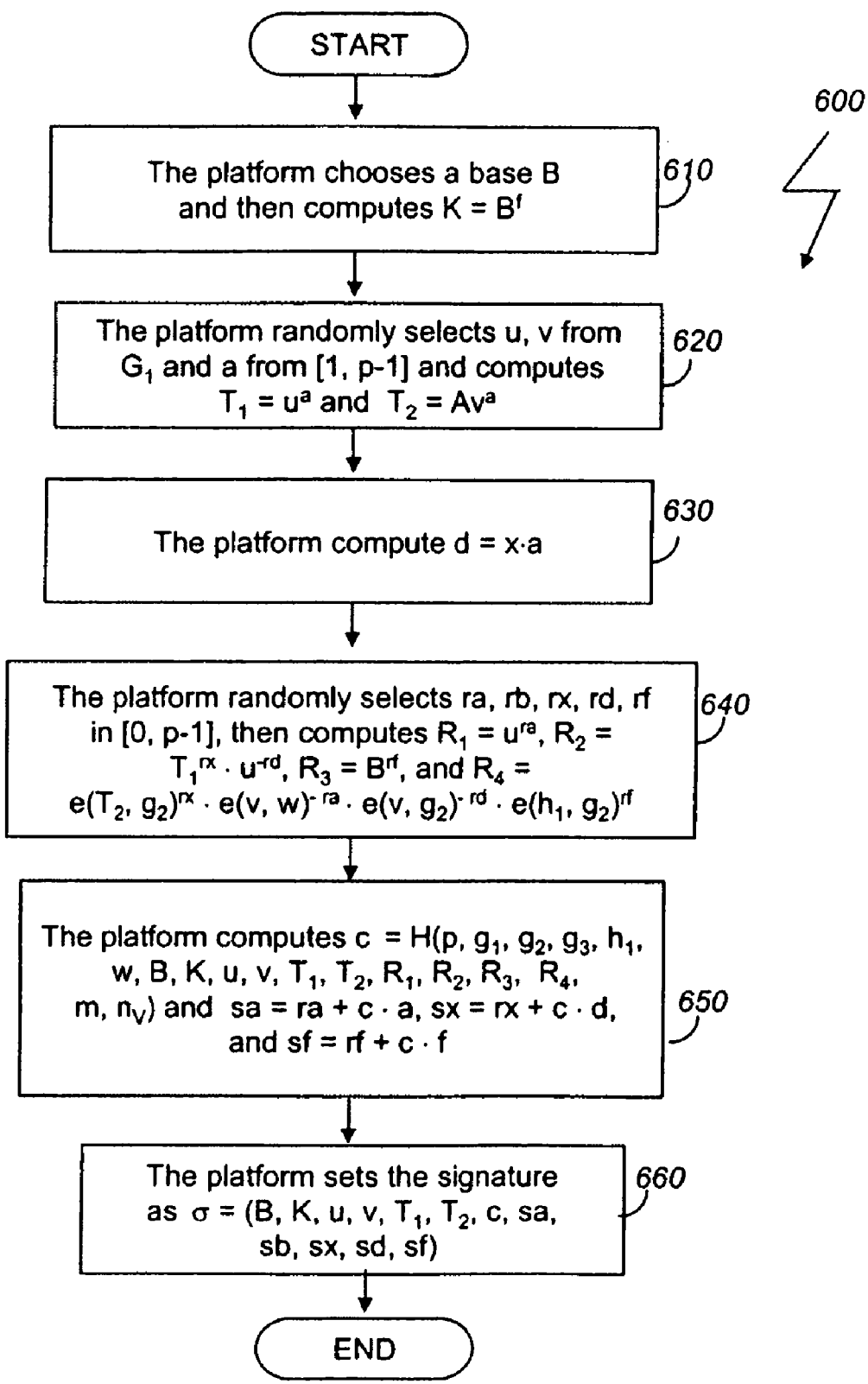
FIG. 12 is a flowchart illustrating a method for a join procedure according to a DAA scheme that is based on a short-group signature scheme, according to one embodiment.

FIG. 12 is a flow chart illustrating a method 600 for verification of an anonymous hardware device to establish the hardware device as a member of a trusted platform group according to one embodiment. Given a group public key $(p, g_1, g_2, g_3, G_1, G_2, G_3, h_1, w)$ a user's private membership key $(A, x, f)$, a message m, a nonce $n_v$ from the verifier, a base-name value provided by the verifier, the platform computes the signature as follows.

Referring to FIG. 12, at process block 610, the platform computes B as follows. In a named base option, the platform computes $B = H_3(\text{base-name})$. In random base option, the platform chooses a random B from $G_3$. The platform then computes $K = B^f$. At process block 6 the platform randomly selects u, v from $G_1$ and a from $[0, p-1]$. In addition, the platform then computes $T_1 = u^a$ and $T_2 = Av^a$. At process block 630, the user then computes $d = x \cdot a$. At process block 640, the platform randomly picks four integers ra, rx, rd, rf from $[0, p-1]$. In addition, the platform computes $R_1 = u^{ra}$, $R_2 = T_1^{rx} \cdot u^{-rd}$, and $R_3 = B^{rf}$. The platform computes $R_4 = e(T_2, g_2)^{rx} \cdot e(v, w)^{-ra} \cdot e(v, g_2)^{-rd} \cdot e(h_1, g_2)$. At process block 650, the platform computes $c = H(p, g_1, g_2, g_3, h_1, w, B, K, u, v, T_1, T_2, R_1, R_2, R_3, R_4, m, n_v)$. In addition, the platform computes $sa = ra + c \cdot a$, $sx = rx + c \cdot x$, $sd = rd + c \cdot d$, and $sf = rf + c \cdot f$. At process block 660, the platform sets the signature $\sigma = (B, K, u, v, T_1, T_2, c, sa, sx, sd, sf)$.

Figure 13:
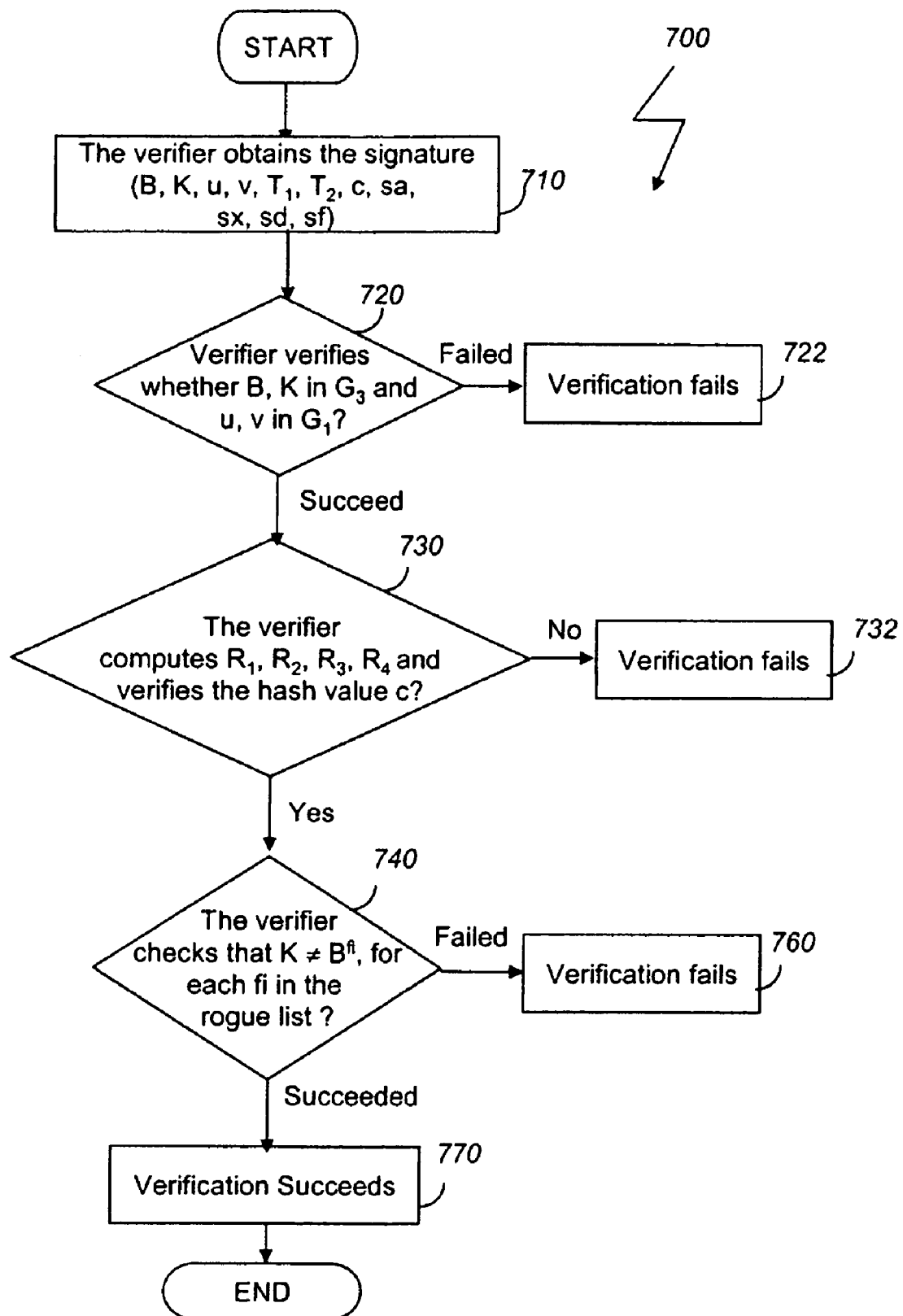
FIG. 13 is a flowchart illustrating a method for a verification procedure according to a DAA scheme based on a short-group signature scheme, according to one embodiment.

The verify procedure for this DAA scheme based may be performed, as shown in FIG. 13. FIG. 13 is a flowchart illustrating a method 700 for verification of the signatures to establish an anonymous hardware device as a member device of a trusted platform group according to one embodiment. Given a group public key $(p, g_1, g_2, g_3, G_1, G_2, G_3, h_1, w)$ as obtained at process block 710, a message m and a nonce $n_v$, and a group signature $\sigma = (B, K, u, v, T_1, T_2, c, sa, sx, sd, sf)$, a verifier can verify the signature as follows. At process block 720, the verifier first verifies that B, K are in $G_3$ and u, v are in $G_1$. At process block 730, the verifier computes $R_1 = u^{sa} \cdot T_1^{-c}$, $R_2 = T_1^{sx} \cdot u^{-sd}$, and $R_3 = B^{sf} \cdot K^{-c}$. In addition, the verifier computes $R_4 = e(T_2, g_2)^{sx} \cdot e(v, w)^{-sa} \cdot e(v, g_2)^{-sd} \cdot e(h_1, g_2)^{sf} \cdot (e(T_2, w)/e(g_1, g_2))^c$. The verifier also verifies that $c = H(p, g_1, g_2, h_1, w, B, K, u, v, T_1, T_2, R_1, R_2, R_3, R_4, m, n_v)$ at process block 730. At process block 740, for each fi in the revocation list, the verifier checks that $K \neq B^{fi}$.

There are several possible variations of the DAA schemes of the described embodiments. The following variations may be made to the described embodiments to either enhance the performance or simplify our schemes.

Revocation Group. In a DAA scheme described above, a group $G_3$ of order p is used for the revocation purpose. One way to choose $G_3$ is to find an elliptic curve group with order p. However, we are not limited to such choices. Any group of order p where the decisional Diffie-Hellman (DDH) problem is hard will work for our purpose. For example, we can choose $G_3$ as follows: We choose a large prime q such that p divides q−1 and $p^2$ does not divide q−1. We can choose $G_3$ to be the only order p subgroup of $Z_q$. We can choose $G_3$ to be the same group as $G_T$. Or we may choose $G_3$ to be the same as $G_1$, if the DDH problem in $G_1$ is hard.

Pre-computation. In a DAA scheme described above, the platform may choose a new h. We can enhance the performance of a DAA scheme by using $h_1$ as h. This allows the platform and the verifier pre-compute most of the pairing operations. In other words, the platform chooses h to be the same as h1. As a result, the platform can pre-compute $e(A, g_2)$, $e(h, w)$, and $e(h, g_2)$. The verifier can pre-compute $e(h, w)$, $e(h, g_2)$, and $e(g_1, g_2)$.

Trusted Issuer. In a DAA scheme described above, the issuer does not learn the private member values of the platforms. If we assume the issuer is trusted and loosen the requirement. That is, if we allow the issuer to learn the platforms' private member values, we can enhance the performance of our DAA scheme by another 10-20%. The key idea here is to use x for revocation instead of choosing f. In one embodiment, a DAA scheme described above, may be modified as follows to provide an alternate DAA scheme.

Figure 14:
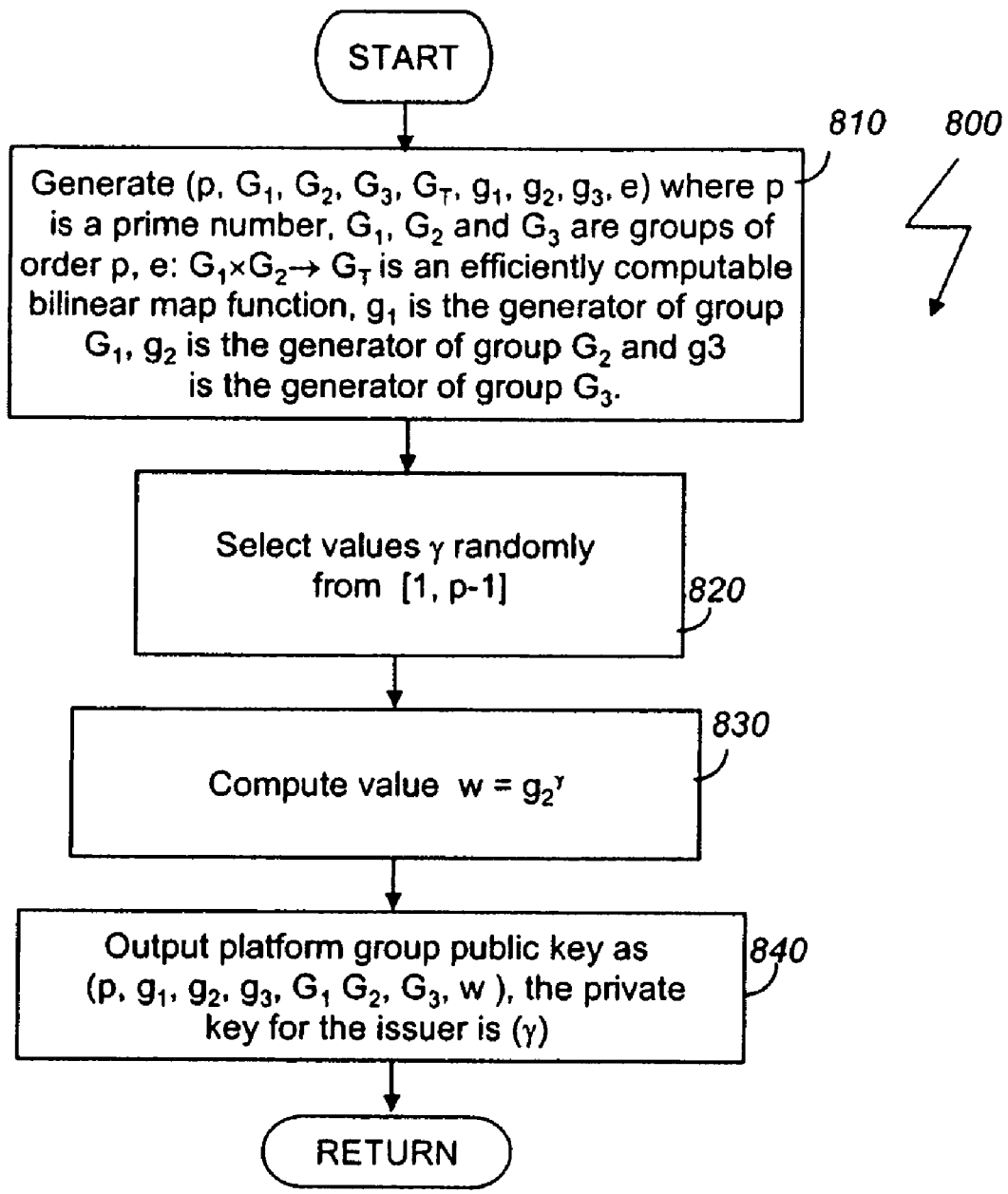
FIG. 14 is a flowchart illustrating a method for a setup procedure for an alternate DAA scheme, according to one embodiment.

FIG. 14 is a flowchart illustrating a method for a setup procedure for the alternative DAA scheme, according to one embodiment. At process block 810, the issuer chooses bilinear groups $G_1$ and $G_2$ of prime order p with generators $g_1$ and $g_2$, respectively. Let e: $G_1 \times G_2 \rightarrow G_T$ be an efficiently computable bilinear map function. The issuer chooses also a group $G_3$ of prime order p with generator $g_3$ where decisional Diffie-Hellman problem in $G_3$ is hard. At process block 820, the issuer select a random $\gamma$ from [1, p-1] and compute $w=g_2^\gamma$. The public key of the group is (p, $g_1, g_2, g_3, G_1, G_2, G_3$, w). The issuer sets $\gamma$ as its secret key. Let $H_3(\bullet)$ be a collision resistant hash function that maps any length messages to elements in $G_3$.

Figure 15:
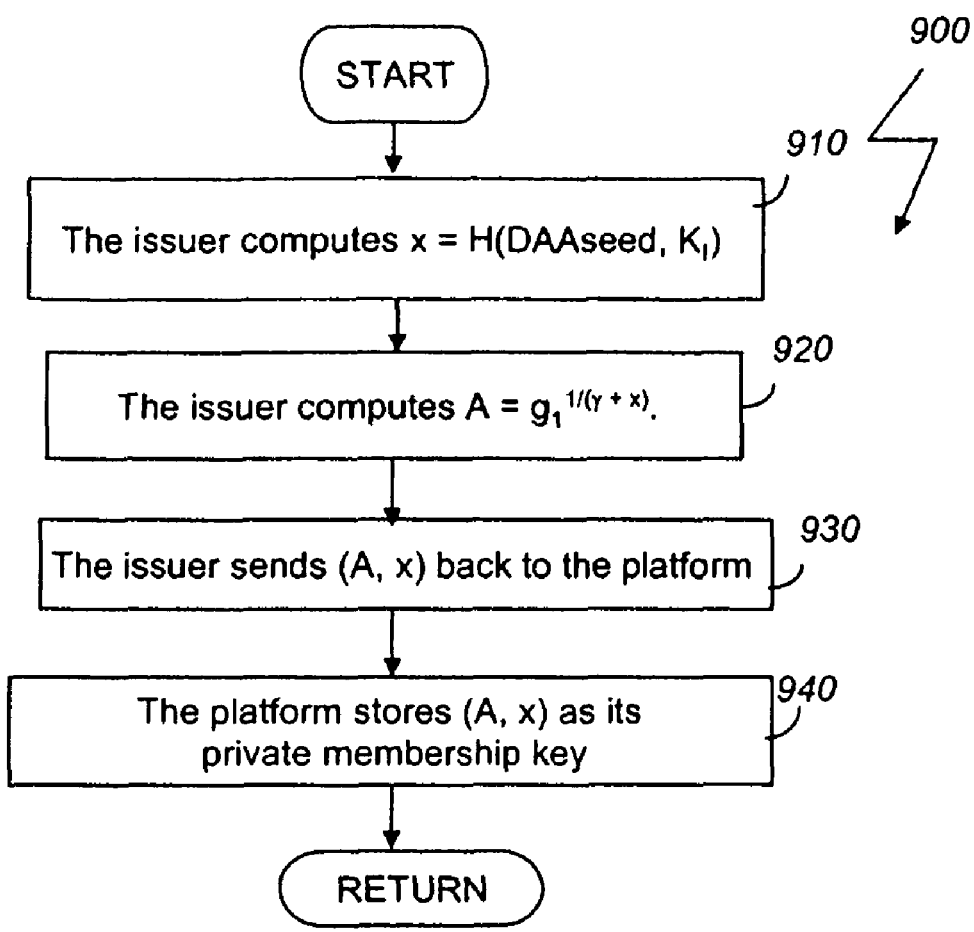
FIG. 15 is a flowchart illustrating a method for a join procedure of the alternative DAA scheme, according to one embodiment.

FIG. 15 is a flowchart illustrating a method for digital signature verification according to the alternative DAA scheme of one embodiment. A platform interacts with the issuer to join the group. Let (p, $g_1, g_2, g_3, G_1, G_2, G_3$, w) be the group pubic key and $K_1$ be a long tern public key of the issuer. Let DAAseed be the seed to compute the private member value of the private membership key of the platform. The join protocol may be performed as shown in FIG. 15. At process block 910, the issuer computes $x=H(DAAseed, K_1)$. At process block 920, the issuer computes $A=g_1^{1/(\gamma+x)}$. At process block 930, the issuer sends (A, x) back to the platform. At process block 940, the platform keeps (A, x) as its membership private key.

The sign procedure for the alternate DAA scheme may be performed as shown in FIG. 12. Given a group public key (p, $g_1, g_2, g_3, G_1, G_2, G_3$, w) a user's private key (A, x), a message m, a nonce $n_V$ from the verifier, a base-name value provided by the verifier, the platform computes the signature as follow for the alternative DAA scheme, according to one embodiment:

1. The platform computes B as follows. In the named base option, the platform computes $B=H_3$(base-name). In random base option, the platform chooses a random B from $G_3$. The platform then computes $K=B^x$.
2. The platform selects randomly u, v from $G_1$ and a from [0, p-1].
3. The platform then computes $T_1=u^a$ and $T_2=Av^a$.
4. The user then computes $d=x \cdot a$.
5. The platform randomly picks four integers ra, rx, rd, rf from [0, p-1].
6. The platform computes $R_1=u^{ra}$, $R_2=T_1^{rx} \cdot u^{-rd}$, and $R_3=B^{rx}$.
7. The platform computes $R_4=e(T_2, g_2)^{rx} \cdot e(v, w)^{-ra} \cdot e(v, g_2)^{-rd}$.
8. The platform computes $c=H(p, g_1, g_2, g_3, w, B, K, u, v, T_1, T_2, R_1, R_2, R_3, R_4, m, n_V)$.
9. The platform computes $sa=ra+c \cdot a$, $sx=rx+c \cdot x$, $sd=rd+c \cdot d$.
10. The platform sets the signature $\sigma=(B, K, u, v, T_1, T_2, c, sa, sx, sd)$.

Verification of a signature from an anonymous hardware device to verify that such anonymous hardware device is a member of a trusted platform group according to an alternative DAA scheme may be performed with reference to FIG. 13, according to one embodiment. Given a group public key (p, $g_1, g_2, g_3, G_1, G_2, G_3$, w), a message m and a nonce $n_V$, and a group signature $\sigma=(B, K, u, v, T_1, T_2, c, sa, sx, sd)$, a verifier can verify the signature as follows:

1. The verifier first verifies that B, K in $G_3$ and u, v in $G_1$.
2. The verifier computes $R_1=u^{sa} \cdot T_1^{-c}$, $R_2=T_1^{sx} \cdot u^{-sd}$, and $R_3=B^{sx} \cdot K^{-c}$.
3. The verifier computes $R_4=e(T_2, g_2)^{sx} \cdot e(v, w)^{-sa} \cdot e(v, g_2)^{-sd} \cdot (e(T_2, w)/e(g_1, g_2))^c$.
4. The verifier verifies that $c=H(p, g_1, g_2, w, B, K, u, v, T_1, T_2, R_1, R_2, R_3, R_4, m, n_V)$.
5. For each fi in the revocation list, the verifier checks that $K \neq B^{fi}$.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method for anonymous attestation using elliptic curve computations and pairing based cryptography comprising:
   verifying that an anonymous hardware device of a host platform has generated a private member value to begin formation of a private membership key without disclosure of the private member value of the anonymous hardware device to an issuer, wherein verifying further comprises receiving a pseudonym, F, of the form $F=h_1^f$, where f is the private member value and $h_1$ is a cryptographic parameter of a group public key, and receiving proof from the anonymous hardware device to verify that the private member value is stored within the anonymous hardware device, the proof comprising proof of knowledge of the form $\log h_1 F$, and
   assigning a cryptographic pair to the anonymous hardware device to render the anonymous hardware device a trusted member device of a trusted membership group, the cryptographic pair being used to complete formation of the private membership key, the private membership key including the private member value and the cryptographic pair, wherein
   a size of the private membership key is reduced for storage within a trusted platform module of the host platform, the private membership key used to generate a short-group signature.

2. The method for anonymous attestation using elliptic curve computations of claim 1, wherein the issuer is a certifying manufacturer of the trusted member device.

3. The method for anonymous attestation using elliptic curve computations of claim 1, further comprising:
   selecting, by the issuer, a random value, x; and
   computing, by the issuer, $A=(g_1F^{-1})^{1/(\gamma+x)}$, where ($\gamma$) is the group private key of the issuer and $g_1$ is a cryptographic parameter of the group public key.

4. The method for anonymous attestation using elliptic curve computations of claim 1, wherein assigning a cryptographic pair comprises:
sending, by the issuer, the cryptographic pair, (A, x), to a host of the trusted member device, wherein (A, x, f) is the private membership key of the trusted member device, f being the private member value, the private membership key to be stored by the trusted member device.

5. The method for anonymous attestation using elliptic curve computations of claim 1, further comprising:
creating a group public/private key pair, the group public/private key pair being for a trusted membership group, the trusted membership group being defined by an issuer.

6. The method for anonymous attestation using elliptic curve computations of claim 1, wherein the short-group signature is to prove membership within the trusted membership group.

7. A system, comprising:
a verifier platform coupled to a network; and
an anonymous prover platform coupled to the network, the anonymous prover platform comprising:
a bus;
a processor coupled to the bus;
a chipset coupled to the bus, the chipset including a trusted platform module, the trusted platform module to sign a message received from the verifier platform, the message signed using a private membership key of the anonymous prover platform, and to transmit a digitally signed message, the digitally signed message including a short-group signature of the anonymous prover platform to the verifier platform, the verifier platform to authenticate the short-group signature to verify that the anonymous prover platform is a trusted member device of a trusted membership group;
the verifier platform to verify that the anonymous prover platform remains a trusted member device of the trusted membership group according to a rogue list of compromised member values without determining a private member value or any device identification information of a user of the anonymous prover platform to enable the user to remain anonymous to the verifier platform using elliptic curve computations and pairing based cryptography, wherein
a size of the private membership key is reduced for storage within the trusted platform module of the anonymous prover platform, the private membership key used to generate the short-group signature;
key logic to generate the private member value, f, according to an attestation seed; and
join logic, including logic to compute cryptographic parameters and for receiving a group cryptographic pair, (A,x), from the issuer, wherein the private membership key of the anonymous prover platform includes the private member value, f, and the group cryptographic pair, (A,x), the private member value, f, being unknown to the issuer.

8. The system of claim 7, wherein the verifier platform comprises:
authentication logic to determine whether the short-group signature of the anonymous prover platform was generated with a revoked member value and to identify the anonymous prover platform as an untrusted hardware device.

9. The system of claim 7, wherein the trusted membership group is established by an issuer and the private member value of the private membership key of the anonymous prover platform is unknown to the issuer.

10. The system of claim 7, wherein the chipset comprises a graphics controller.

11. The system of claim 7, wherein a graphics driver of the anonymous prover platform is the trusted member device.

12. The system of claim 7, wherein the size of the private membership key is within the range of 96 bytes and 128 bytes.

13. The system of claim 7, wherein the private member value of the anonymous prover platform is known to an issuer to further reduce the size of the private membership key.

* * * * *

UNITED STATES PATENT AND TRADEMARK OFFICE
CERTIFICATE OF CORRECTION

PATENT NO. : 8,356,181 B2  
APPLICATION NO. : 12/208989  
DATED : January 15, 2013  
INVENTOR(S) : Brickell et al.

Page 1 of 1

It is certified that error appears in the above-identified patent and that said Letters Patent is hereby corrected as shown below:

In the Specification

In column 9, at line 32 delete, "(P, $g_1$, $g_2$, $g_3$," and insert -- (p, $g_1$, $g_2$, $g_3$, --.

In column 10, at line 14 delete, "R, $n_l$)." and insert -- R, $n_l$). --.

In column 10, at line 18 delete, "R, $n_l$)." and insert -- R, $n_l$). --.

In column 11, at line 12 delete, "$v^{se}$," and insert -- $v^{-se}$, --.

In column 12, at line 23 delete, "$e(h_1, g_2)$." and insert -- $e(h_1, g_2)^{rf}$. --.

Signed and Sealed this  
Sixth Day of May, 2014

Michelle K. Lee  
*Deputy Director of the United States Patent and Trademark Office*